(12) United States Patent
Kulkarni et al.

(10) Patent No.: US 8,419,844 B1
(45) Date of Patent: Apr. 16, 2013

(54) MIST/MOISTURE REMOVAL USING FIXED BED TRICKLE COLUMNS

(76) Inventors: Abhijeet Madhukar Kulkarni, Basingstoke (GB); Richard Michael Ashley Mass, Basingstoke (GB); John Carl Davies, Portsmouth (GB)

( * ) Notice: Subject to any disclaimer, the term of this patent is extended or adjusted under 35 U.S.C. 154(b) by 0 days.

(21) Appl. No.: 13/251,324

(22) Filed: Oct. 3, 2011

(51) Int. Cl.
*B01D 53/14* (2006.01)

(52) U.S. Cl.
USPC ............. 96/290; 96/292; 95/211; 95/231; 60/39.3; 60/39.53; 60/39.59

(58) Field of Classification Search .............. None
See application file for complete search history.

(56) References Cited

U.S. PATENT DOCUMENTS

| | | | |
|---|---|---|---|
| 7,632,339 B2 | 12/2009 | Singh | |
| 8,240,122 B2 * | 8/2012 | Araki et al. ............ | 60/39.3 |
| 2004/0163536 A1 * | 8/2004 | Baudat et al. .......... | 95/214 |
| 2005/0081715 A1 * | 4/2005 | Goodwin et al. ....... | 95/211 |
| 2005/0093183 A1 * | 5/2005 | Lewis et al. ........... | 261/94 |

OTHER PUBLICATIONS

Citing the definition of "hood" as found in Merriam-Webster Dictionary online. www.merriam-webster.com/dictionary/hood (Nov. 7, 2012).*

* cited by examiner

*Primary Examiner* — Duane Smith
*Assistant Examiner* — Pankti Patel
(74) *Attorney, Agent, or Firm* — Cooper Legal Group, LLC

(57) ABSTRACT

A moisture removal system for removing water moisture from an air stream and an associated method are provided. The moisture removal system includes one or more packed beds that include a water-entry surface at which liquid water is received and an air-entry surface that is located substantially opposite the water-entry surface and at which the air stream is received. The air stream passes through the one or more packed beds in a direction substantially counter-current to the passage of the liquid water and the liquid water and the air stream contact one another in the one or more packed beds resulting in the removal of at least a portion of the water moisture from the air stream. The moisture removal system can be located upstream of and be operably connected to the inlet of a gas turbine system to which the air stream is delivered from the moisture removal system.

20 Claims, 3 Drawing Sheets

MIST/MOISTURE REMOVAL USING FIXED BED TRICKLE COLUMNS

BACKGROUND OF THE INVENTION

The present invention relates generally to method and apparatus concerning the removal of water moisture from a gas and, in particular, to method and apparatus concerning the removal of water moisture from ambient air prior to the ambient air being applied at a gas turbine system.

The removal of water moisture from gases, including the removal of finely divided water droplets suspended in air for example and referred to herein as an air/water mist, is performed in a variety of circumstances. One such circumstance, for example, concerns the operation of a gas turbine system for generating electricity in which an ambient air stream is mixed with fuel and the mixture combusted to produce gaseous products of combustion that are employed to drive a turbine that powers a rotor of an electric generator. Typically in such an operation, the ambient air that is mixed with the fuel can first be subjected to certain conditioning procedures.

As an example of the foregoing, the ambient air can be filtered to remove particulate matter that can damage the turbine equipment and the air can be cooled to become more dense. The denser air provides a higher mass flow rate and pressure ratio at the gas turbine equipment, resulting in an increase in turbine output and efficiency. In certain instances in which the air is filtered so as to remove particulate matter, water moisture that can be present in the air can be deposited at the filters. The water moisture deposited in this way at the filters can combine with the solid particulate matter also deposited at the filters forming a coating on the filters that interferes with the free flow of the air through the filters. As a result, an increased pressure loss can be experienced at the filters. Thus, it can be advantageous to remove the water moisture from the air stream delivered to the filters and subsequently applied at the gas turbine system.

One technique for removing the water moisture from an air stream involves the use of inertial separators or drift eliminators that force the air stream to pass along a tortuous pathway that causes the particles of water moisture to drop out of the air stream. This technique is best suited for particles of water moisture that are larger than the droplets of water that are present in an air/water mist. Another technique involves the use of so-called coalescing filters. In this technique, an air stream containing the particles of water moisture is caused to pass through a network of coalescing filters with which the particles of water moisture collide, thereby dropping out of the air stream. In addition, the particles of water moisture can collide with one another and, as a result, drop out of the air stream.

BRIEF DESCRIPTION OF THE INVENTION

The following sets forth a simplified summary of examples of the present invention for the purpose of providing a basic understanding of selected aspects of the invention. The summary does not constitute an extensive overview of all the aspects or embodiments of the invention. Neither is the summary intended to identify critical aspects or delineate the scope of the invention. The sole purpose of the summary is to present selected aspects of the invention in a simplified form as an introduction to the more detailed description of the embodiments of the invention that follows the summary.

In accordance with an aspect of the present invention, a moisture removal system is provided for removing water moisture from an air stream. The moisture removal system includes one or more packed beds that include a water-entry surface at which liquid water is received and thereafter passes through the one or more packed beds. Also included in the moisture removal system, as a component of the one or more packed beds, is an air-entry surface that is located substantially opposite the water-entry surface. The air stream containing water moisture is received at the air-entry surface and thereafter passes through the one or more packed beds in a direction substantially counter-current to the passage of the liquid water through the one or more packed beds. The liquid water and the air stream come into contact with one another as they pass through the one or more packed beds resulting in the removal of at least a portion of the water moisture from the air stream. The moisture removal system also can include a respective water-supply apparatus such as a spray head that can be located above the water-entry surface of the at least one of the one or more packed beds for example. The water-supply apparatus can be configured to furnish the liquid water to the water-entry surface of the at least one of the one or more packed beds and distribute the liquid water to substantially the entirety of the water-entry surface. The moisture removal system can be located upstream of and be operably connected to an inlet of a gas turbine system to which the air stream is delivered after at least a portion of the water moisture has been removed from the air stream at the at least one of the one or more packed beds.

In accordance with another aspect of the invention, a method is provided of removing water moisture from an air stream. The method includes providing one or more packed beds that include a water-entry surface at which liquid water is received and thereafter passes through the one or more packed beds. The method also includes providing a respective water-supply apparatus that can be configured to furnish the liquid water to the water-entry surface of the one or more packed beds such as a spray head. The spray head can be located above the water-entry surface of the one or more packed beds and can distribute the liquid water to substantially the entirety of the water-entry surface. The one or more packed beds also can include an air-entry surface at which the air stream containing water moisture is received and thereafter passes through the one or more packed beds. The air-entry surface is located substantially opposite the water-entry surface so that the air stream passes through the one or more packed beds in a direction substantially counter-current to the passage of the liquid water through the one or more packed beds. The air stream containing water moisture can be delivered to the air-entry surface of the one or more packed beds and thereafter passed through the one or more packed beds. The air stream containing water moisture can be contacted with the liquid water as the air stream and the liquid water pass through the one or more packed beds, thereby removing at least a portion of the water moisture from the air stream. The moisture removal system can be located upstream of and be operably connected to the air inlet of a gas turbine system to which the air stream is delivered after at least a portion of the water moisture is removed from the air stream at the one or more packed beds.

BRIEF DESCRIPTION OF THE DRAWINGS

The foregoing and other aspects of the present invention will be apparent to those skilled in the art to which the present invention relates from the detailed descriptions of examples of aspects and embodiments of the invention that follow with reference to the accompanying drawings, wherein the same reference numerals are used in the several figures to refer to the same parts or elements and in which.

DETAILED DESCRIPTION

Examples of embodiments that incorporate one or more aspects of the present invention are described below with references, in certain respects, to the accompanying drawings. These examples are not intended to be limitations on the present invention. Thus, for example, in some instances, one or more examples of the present invention described with reference to one aspect or embodiment can be utilized in other aspects and embodiments. In addition, certain terminology is used herein for convenience only and is not to be taken as limiting the present invention.

Figure 1:
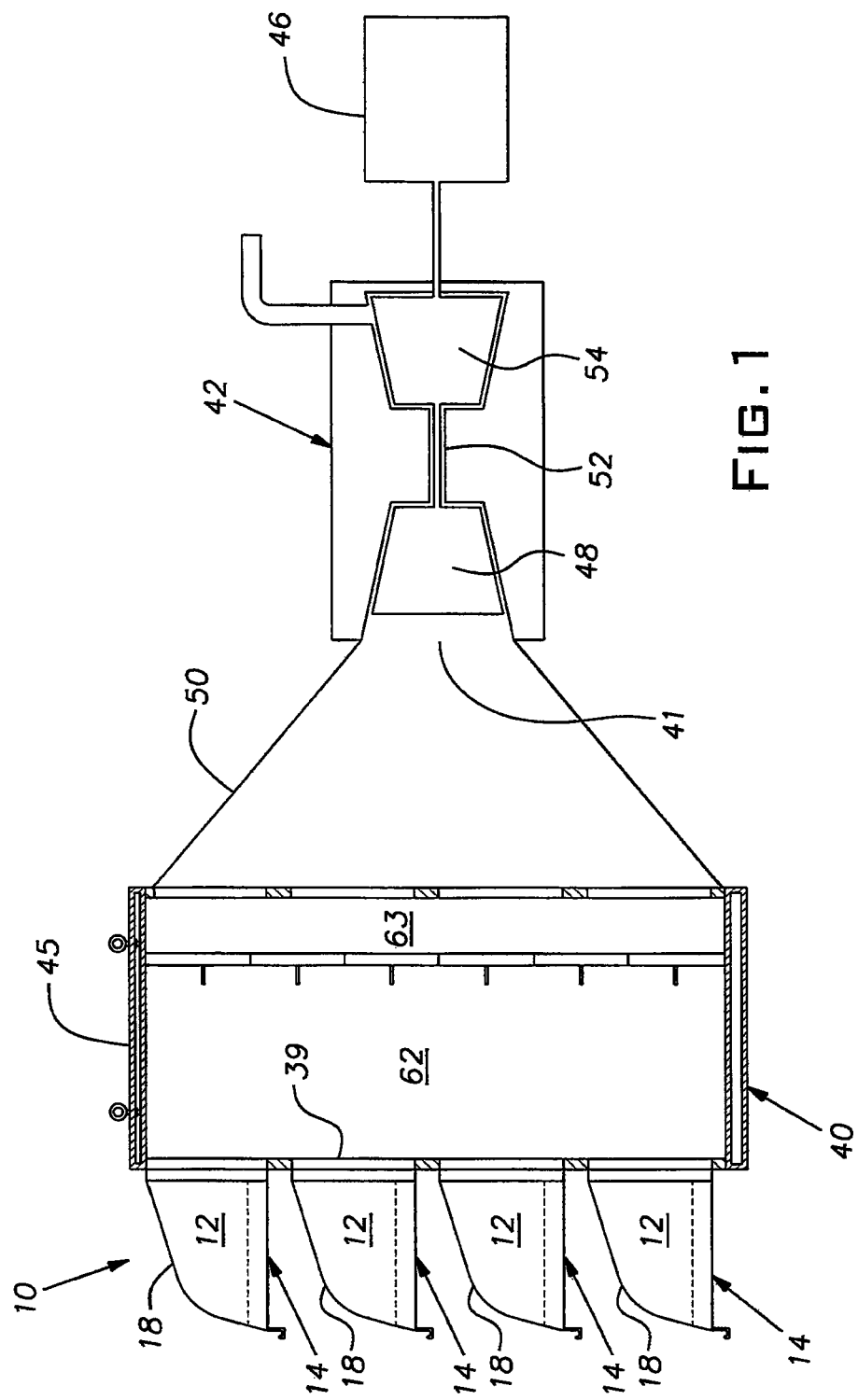
FIG. 1 is a schematic side elevational view of an example of a moisture removal system for removing water moisture from an air stream prior to the air stream being delivered to a system for conditioning the air stream after which the conditioned air stream is delivered to a gas turbine system.

FIG. 1 schematically illustrates an aspect of the present invention wherein a moisture removal system, indicated generally at 10, for removing water moisture from an air stream is associated with an air-conditioning system, indicated generally at 40. The moisture removal system 10 is located at an air inlet 39 of the air-conditioning system 40 that further conditions the air stream after the air stream has passed through the moisture removal system 10 so that the air stream is suitable for application at a gas turbine system, indicated generally at 42. Thus, the moisture removal system 10, which is described in greater detail below, is located upstream of and is operably connected to the inlet 41 of the gas turbine system 42 to which the air stream is delivered and applied after at least a portion of the water moisture that the air stream contains is removed from the air stream at the moisture removal system. The moisture removal system 10 also can be employed in instances in which the air stream is applied to systems and equipment other than gas turbine systems such as the air intakes of internal combustion engines and heating, cooling and ventilating systems for example.

A compressor 48 at the gas turbine system 42 functions to draw an ambient air stream through the moisture removal system 10 into the air inlet 39 of the air-conditioning system 40 and through the air-conditioning system. The air stream, after having had water moisture removed at the moisture removal system 10 and having been further conditioned at the air-conditioning system 40, passes through the adapter duct 50 that tends to narrow the air stream to the smaller dimensions of the inlet 41 of the gas turbine system 42 at the compressor 48. The conditioned air, upon entering the compressor 48, is compressed to high pressures.

The air, after being compressed enters a combustion area 52 where the compressed air is mixed with a fuel such as natural gas, for example, and the mixture is burned to produce high-pressure, high-velocity gases that are the products of the combustion that takes place in the combustion area 52. The high-pressure, high-velocity gases proceed to a turbine 54 and drive the blades of the turbine that are attached to an output shaft. The rotation of the turbine blades causes the attached output shaft to rotate as well, and the energy of the rotating output shaft is delivered to a generator 46 and electrical energy thereby produced at the generator according to procedures familiar to those having ordinary skill in the art. The application of gas turbine systems is not limited to electrical power generation, however, and the gas turbine systems also can be applied, for example, to driving pumps and compressors as is known to those having ordinary skill in the art.

In order to use air from the ambient environment at the gas turbine system 42, the ambient air must first be conditioned and that is accomplished at the moisture removal system 10 and the air-conditioning system 40. Again referring to FIG. 1, as noted above, an ambient air stream, under the influence of the compressor 48, is first drawn into the moisture removal system 10 at which water moisture is removed and the air stream having had at least a portion of its water moisture removed then enters the air-conditioning system 40 at air inlet 39. At the air-conditioning system 40, which can be contained within a housing 45, the air stream can proceed through a filter chamber 62 where particulate matter suspended in the air can be removed from the air stream by filters not shown. Thereafter, the air stream having had at least some of its water moisture and suspended particulate matter removed can be directed through a cooler chamber 63 containing a cooling device such as an evaporative cooler for example. The evaporative cooler would function to cool and increase the density of the air stream. The denser air would provide a higher mass flow rate and pressure ratio at the gas turbine system 42, resulting in an increase in turbine output and efficiency.

From the cooler chamber 63, the conditioned air stream would flow into the adapter duct 50, and from the adapter duct the air would flow to the gas turbine system 42 through the inlet 41 of the gas turbine system. The conditioned air after being compressed at the compressor 48 would be mixed with fuel and burned as described above. The arrows in FIG. 1 are all indicative of the direction in which the air flows from its entry into the moisture removal system 10 through the air-conditioning system 40 to the delivery of the air at the inlet 41 of the gas turbine system 42 at the compressor 48.

Figure 2:
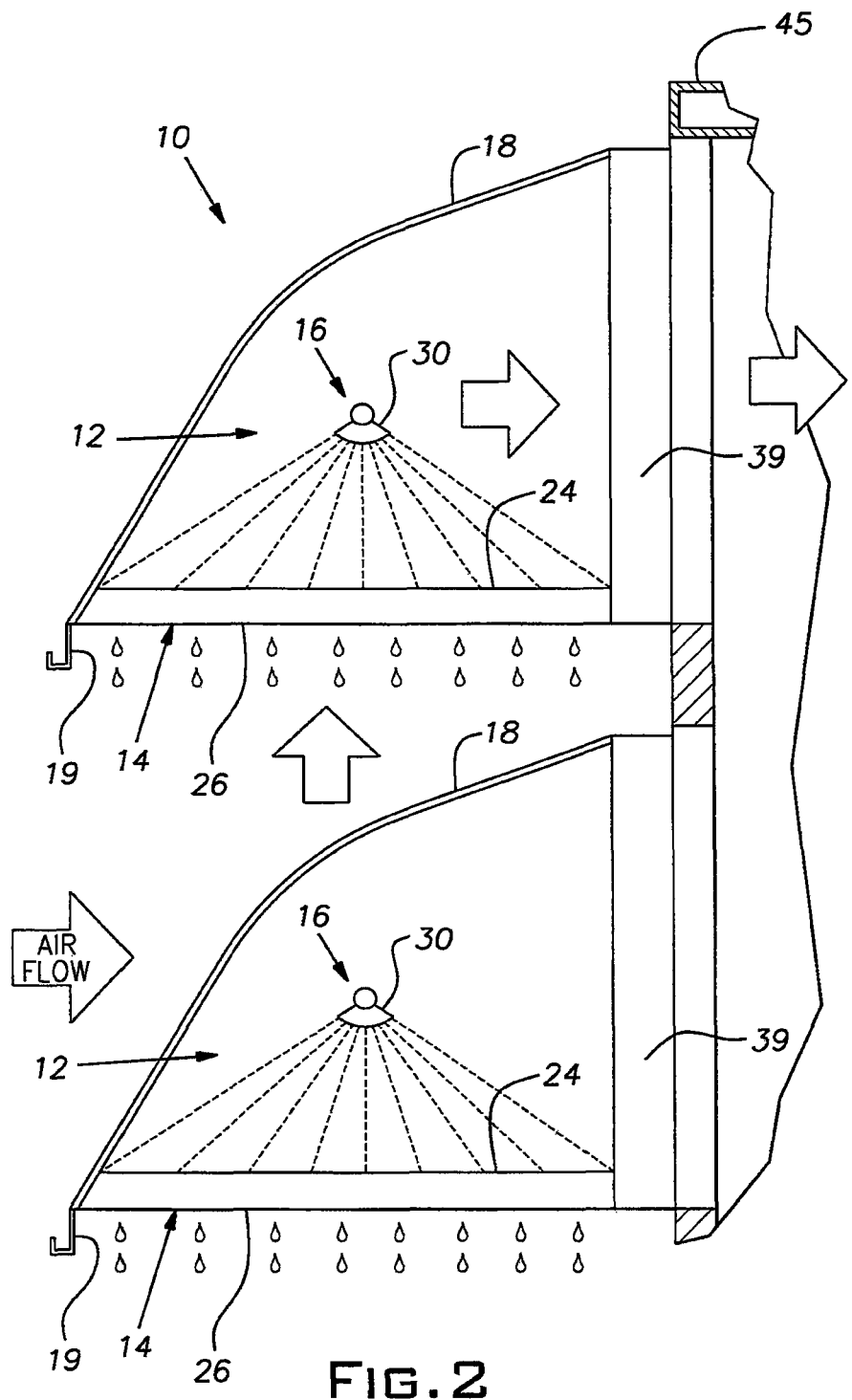
FIG. 2 is a schematic enlarged view of a portion of the moisture removal system of FIG. 1.

Considering now a more detailed description of the moisture removal system 10 for removing water moisture from an air stream and its operation, reference is first had to FIGS. 1 and 2 of the drawings. In the aspect of the invention illustrated in FIGS. 1 and 2, the moisture removal system 10 is shown as including a plurality of like units indicated generally at 12. Each unit 12 of the moisture removal system 10 includes a packed bed, indicated generally at 14, and a respective water-supply apparatus, indicated generally at 16. Depending on a number of factors, including the operational demands of the system that the moisture removal system 10 serves, the moisture removal system can include one or more of the units 12 and, correspondingly, one or more packed beds 14. Additionally, each unit 12 can include more than one packed bed. As used herein, the designation "packed bed" is intended to have the meaning attributed to the designation by those having ordinary skill in the chemical engineering arts. Thus, for example, a "packed bed" would be inclusive of a "packed column" and a "fixed bed trickle column."

Each unit 12 is located at the bottom or entranceway of a hood 18 that can be secured to the housing 45 that contains the air-conditioning system 40. The moisture removal system 10 can be located out doors and the hoods, because they cover the units 12, provide protection to the units from the elements such as rain and snow. In addition, the hoods act to define a passageway for ambient air to be directed from the surrounding environment to the air inlet 39 of the air-conditioning system 40. Thus, ambient air streams will be drawn up under the hoods through the entranceways of the hoods and through the packed beds 14 at which water moisture will be removed from the air stream and from which the air stream will thereafter enter the air-conditioning system 40 through the air inlet 39.

Figure 3:
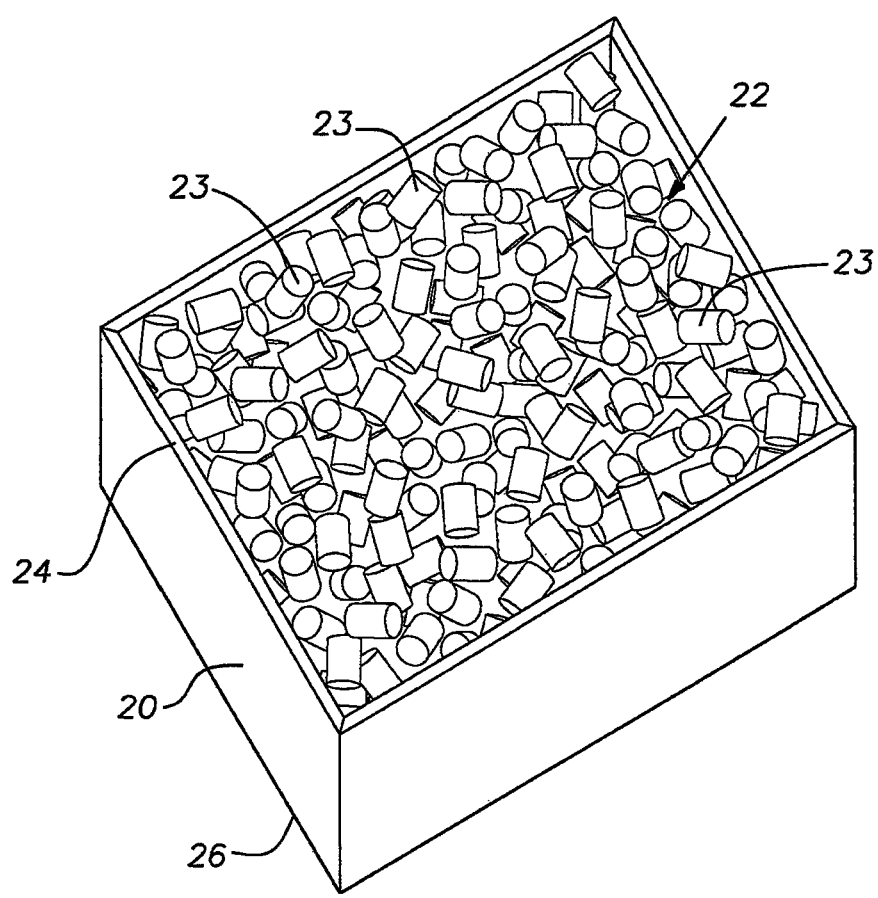
FIG. 3 is a schematic perspective view of an example of a packed bed that is included in the moisture removal system of FIGS. 1 and 2.

As best seen in FIGS. 2 and 3, the example of the packed bed 14 illustrated in those figures includes a frame 20 that forms an enclosure that is open at the top and bottom. Contained within the frame 20 is a packing material indicated generally at 22. The packed bed 14 can include unstructured packing as the packing material 22 or structured packing as the packing material 22. In the example of FIGS. 2 and 3, unstructured packing in the form of Raschig rings 23 are illustrated as being used. Other examples of unstructured packing that can be used include Pall rings and spherical objects. Structured packing can include a structure formed of a collection of corrugated sheets fixed together for example. Both unstructured and structured packing can be made of a variety of materials including metals, plastics, ceramics, carbon and cellulose for example. Both the top of the packed bed and the bottom of the packed bed can be covered with a mesh-like or net-like element for the purpose of maintaining the packing material 22 in place within the frame 20 while allowing water to enter the water-entry surface and air to enter the air-entry surface of the packed bed. Although the packed bed 14 is shown as having a generally rectangular shape so as to fit the entranceway of the hood 18, the bed can have other shapes such as, for example, a square shape or a circular shape. In particular, the shape of the packed bed can be coordinated with the configuration of the entranceway of the hood 18.

The packing can be infused with a catalyst to enhance the removal of the water moisture from the air stream. In addition, although the packing typically will be hydrophilic, in cases in which the air stream includes an oily component, the packing can be oleophilic.

The packed bed 14 of the moisture removal system 10 which, as noted, can include one or more of such packed beds, includes a water-entry surface 24 at which liquid water is received and thereafter passes or trickles through the packed bed and an air-entry surface 26 located substantially opposite the water-entry surface 24 at which the air stream containing water moisture is received from the environment in which the moisture removal system 10 is located and thereafter passes through the packed bed. As can be understood, with this arrangement of the water-entry surface 24 and the air-entry surface 26, the air stream containing water moisture passes through the packed bed 14 in a direction substantially counter-current to the passage of the liquid water through the packed bed. As used herein, the term "counter-current" is intended to cover any direction of air stream flow that is sufficiently opposed to the direction of flow of the liquid water to result in the shifting or collapsing of the equilibrium between the suspended water particles in the liquid water and the surrounding air in the air stream and provide an acceptable degree of removal of water moisture from the air stream.

Referring now to FIG. 2, there is shown an aspect of a respective water supply apparatus, indicated generally at 30, that is configured to furnish the liquid water to the water-entry surface 24 of at least one of the one or more packed beds at which the water supply apparatus is located. In the illustrated aspect, the water-supply apparatus 30 includes a spray head 32 that is located above the water-entry surface 24 of the at least one of the one or more packed beds. As schematically illustrated in FIG. 2, the spray head 32 is configured to distribute the liquid water to substantially the entirety of the water-entry surface 24 of the at least one of the one or more packed beds. As the liquid water moves down and the air stream moves up and they both pass through the packed bed, the liquid water and the air stream come into contact with one another resulting in the removal of at least a portion of the water moisture from the air stream.

An example of the manner in which the water moisture removal system as described above functions can be considered in connection with the removal of water moisture present in an air/water mist. An air/water mist, which can exist in the form of a fog, can be considered a colloidal suspension formed by the suspension of finely divided water droplets or water particles in an air mass. The water particles remain in suspension due to the pressure/temperature equilibrium that is established between the water particles and the surrounding air in which the water particles are suspended. Shifting or collapsing of the equilibrium can promote the coalescing of the finely divided water particles to an extent that the coalesced particles assume a size and weight that result in the coalesced particles dropping out of the air/water mist and the correlative removal of water moisture from the air in which the particles had been suspended. A function of the packed bed 14 is to shift or collapse the equilibrium that exists between such finely divided water particles and the ambient air stream in which the particles are suspended.

The water from the water-supply apparatus 30 distributes water to essentially the entirety of the water-entry surface 24 of the packed bed 14 at a rate such that the water trickles through the packing material 22 in the packed bed. In other words, the packed bed is not flooded with the water. The objective is to establish conditions in the packed bed 14 such that the pressure drop between the water-entry surface 24 and the air-entry surface 26 is not so great as to materially interfere with the flow of the air stream upward through the packed bed. At the same time, the amount of water is adequate to allow good contact to take place between the water trickling down through the packing material 22 in the packed bed 14 and the air stream passing up through the packing material. The contact is sufficient to shift or collapse the equilibrium between the suspended water particles and the surrounding air in the air/water mist and provide an acceptable degree of removal of water moisture from the air stream.

As the water from the water-supply apparatus 30 and the finely divided water droplets in the air stream come into contact with one another, the equilibrium condition in the air/water mist is shifted and the finely divided water particles coalesce to from water droplets having a weight and volume too great for the coalesced drops to be carried up through the packed bed 14 by the air flow. Consequently, the coalesced drops flow out of the packed bed 14 through the air-entry surface 26 along with the water from the water-supply apparatus 30 that has completely trickled and completed its passage through the packed bed. The shifting of the equilibrium condition can be enhanced by using water from the water-supply apparatus 30 of a temperature that is either higher or lower than the temperature of the finely divided water droplets in the air/water mist.

The air stream exiting the water-entry surface 24, relieved of at least a portion of its water moisture, thereafter flows into the air-conditioning system 40 through the air inlet 39. At the same time, the water, both from the water-supply apparatus 30 and the coalesced water droplets removed from the air/water mist, falls from air-entry surface 26 of the packed bed 14 onto the hood 18 that lies beneath the packed bed. As can be best seen in FIG. 2, the water will flow downwardly over the hood 18 to the bottom edge of the hood where a channel 19 mounted at the edge of the hood conducts the water away from the hood to a suitable water collection site not shown. The water falling from the bottom-most packed bed can be allowed to simply fall to the ground or can be collected in a channel at the ground and conducted to the water collection site. The water accumulated at the water collection site can be filtered and otherwise treated if necessary and recirculated to the water-supply apparatus 30 for reuse at the packing beds.

Although the removal of water moisture from the air stream passing through a packed bed has been described in connection with the removal of finely divided water droplets suspended in an air/water mist, and in that connection the packed bed functions as a mist eliminator, other water moisture, such as water vapor in the air stream and droplets of water so large that they are suspended in the air stream only because they are carried along by the inertia of the air stream, also can be removed at the packed bed 14. In addition, solid particulate matter carried along by the air stream can be removed at the packed bed 14. Thus, the moisture removal system 10 can function cooperatively with the air-conditioning system 40 as a primary stage separator. Additionally, because the undoing of the equilibrium in the air/water mist involves the transfer of heat out of the air in the air stream to the coalesced water drops, the air exiting the water-entry surface 24 of the packed bed 14 can be at a temperature that is lower than the temperature of the air as it enters the packed bed. Thus, the cooling of the air that can take place at the evaporative cooler in the cooler chamber 63 at the air-conditioning system 40 can be augmented by the moisture removal system 10 and the moisture removal system, in that connection, can function as an inlet chiller.

From the foregoing description of certain aspects and embodiments of the invention, it can be understood that the invention also provides for a method of removing water moisture from an air stream by providing a moisture removal system as described in those aspects and embodiments. The method would include furnishing the liquid water to the water-entry surface 24 of the at least one of the one or more packed beds from the water-supply apparatus 30 and passing the liquid water through the at least one of the one or more of the packed beds. The method also would include delivering the air stream containing water moisture to the air-entry surface 26 of the at least one of the one or more packed beds and passing the air stream containing water moisture through the at least one of the one or more packed beds. The method would further include contacting the air stream containing water moisture with the liquid water as the air stream containing water moisture and the liquid water pass through the at least one of the one or more packed beds, thereby removing at least a portion of the water moisture from the air stream.

While the described embodiments of the invention can have general application, certain environments exist at which the embodiments can be particularly beneficially applied. Examples of such environments include environments that have a tendency to be humid so that the ambient air contains large concentrations of water moisture. Coastal environments, particularly tropical coastal environments, can be of that type. In addition, the water moisture contained in the air found at coastal environments can be contaminated with dissolved salt contaminants that can corrode the components of equipment such as the air-conditioning system 40 and the gas turbine system 42. Also in the coastal environments, as well as in other environments, other types of water-soluble harmful contaminants can be present in the ambient air. The application of the described embodiments to air streams that contain these dissolved salt and other water-soluble contaminants can result in the removal of the salts and other contaminants along with the water moisture and thereby preserve the integrity of the systems through which the air streams pass and in which the air streams are used. Thus, in this connection, the moisture removal system can function also as a salt or contaminant removal system.

While the present invention has been described above and illustrated with reference to certain embodiments thereof, it is to be understood that the invention is not so limited. Thus, as noted above, the various aspects of the present invention can have applications in contexts other than with gas turbine systems in which the removal of water moisture from an air stream is advantageous. In addition, modifications and alterations of the aspects of the invention described herein will occur to those skilled in the art upon reading and understanding the specification, including the drawings. For example, the moisture removal system instead of being located outside the confines of the air-conditioning system can be more directly incorporated into the air-conditioning system and can be located indoors. The present invention is intended to cover and include any and all such modifications and variations to the described embodiments that are encompassed by the following claims.

What is claimed is:

1. A moisture removal system for removing water moisture from an air stream of ambient air ingested for use in a turbine system, the ambient air containing water moisture particles, the moisture removal system including:
   a hood located at an air intake entrance of an air system supplying the turbine system with filtered air, the hood has a flow path that is directed at an upstream end to ambient air and that is directed at a downstream end to a filtration chamber of the air system, at the upstream end the hood has a flow area through which raw, ambient air stream moves;
   a water-supply apparatus located and configured to spray liquid water within the hood in a direction counter to flow of air within the hood; and
   a packed bed, located at the upstream end of the hood and upstream of the spray of liquid water within the hood, the packed bed including a water-entry surface at which the liquid water sprayed from the water supply apparatus is received and thereafter passes through the packed bed to wet the packed bed and an air-entry surface, located substantially opposite the water-entry surface and facing raw, ambient air that is external to the hood, at which the air stream is received and thereafter passes through the wetted packed bed in a direction substantially countercurrent to the passage of the liquid water through the packed bed, whereby the liquid water within the wetted packed bed and the air stream come into contact with one another as they pass through the packed bed resulting in coalescing of the moisture particles to the liquid water within the wetted packed bed and removal of at least a portion of the water moisture particles from the air stream.

2. The moisture removal system of claim 1, wherein the packed bed includes unstructured packing as packing material.

3. The moisture removal system of claim 1, wherein the packed bed includes structured packing as packing material.

4. The moisture removal system of claim 1, wherein the water-supply apparatus includes a spray head that is located above the water-entry surface of the packed bed and is configured to distribute liquid water to substantially the entirety of the water-entry surface of the packed bed.

5. The moisture removal system of claim 1, wherein the moisture removal system is located upstream of the turbine system to which the air stream is delivered.

6. The moisture removal system of claim 5, wherein the packed bed includes unstructured packing as the packing material.

7. The moisture removal system of claim 6, wherein the unstructured packing includes Raschig rings.

8. The moisture removal system of claim 6, wherein the unstructured packing includes Pall rings.

9. The moisture removal system of claim 5, wherein the packed bed includes structured packing as the packing material.

10. The moisture removal system of claim 7, wherein the water-supply apparatus includes a spray head that is located above the water-entry surface of the packed bed and is configured to distribute liquid water to substantially the entirety of the water-entry surface of the packed bed.

11. A method of removing water moisture from an air stream of ambient air ingested for use in a turbine system, the ambient air containing water moisture particles, the method including:
   providing a hood located at an air intake entrance of an air system supplying the turbine system with filtered air, the hood has a flow path that is directed at an upstream end to ambient air and that is directed at a downstream end to a filtration chamber of the air system, at the upstream end the hood has a flow area through which raw, ambient air stream moves;
   providing a water-supply apparatus located and configured to spray liquid water within the hood in a direction counter to flow of air within the hood; and
   providing a packed bed, located at the upstream end of the hood and upstream of the spray of liquid water within the hood, the packed bed including a water-entry surface at which the liquid water sprayed from the water supply apparatus is received and thereafter passes through the packed bed to wet the packed bed and an air-entry surface, located substantially opposite the water-entry surface and facing raw, ambient air that is external to the hood, at which the air stream is received and thereafter passes through the wetted packed bed in a direction substantially counter-current to the passage of the liquid water through the packed bed, whereby the liquid water within the wetted packed bed and the air stream come into contact with one another as they pass through the packed bed resulting in coalescing of the moisture particles to the liquid water within the wetted packed bed and removal of at least a portion of the water moisture particles from the air stream.

12. The method of claim 11, wherein the packed bed includes unstructured packing as packing material.

13. The method of claim 11, wherein the packed bed includes structured packing as packing material.

14. The method of claim 11, wherein the water-supply apparatus includes a spray head that is located above the water-entry surface of the packed bed and is configured to distribute water to substantially the entirety of the water-entry surface of the packed bed.

15. The method of claim 11, wherein the moisture removal system is located upstream of the turbine system to which the air stream is delivered.

16. The method of claim 15, wherein the packed bed include unstructured packing as the packing material.

17. The method of claim 16, wherein the unstructured packing includes Raschig rings.

18. The method of claim 16, wherein the unstructured packing includes Pall rings.

19. The method of claim 15, wherein the packed bed includes structured packing as the packing material.

20. The method of claim 15, wherein the water-supply apparatus includes a spray head that is located above the water-entry surface of the packed bed and is configured to distribute water to substantially the entirety of the water-entry surface of the packed bed.

* * * * *

UNITED STATES PATENT AND TRADEMARK OFFICE
CERTIFICATE OF CORRECTION

PATENT NO.         : 8,419,844 B1
APPLICATION NO.    : 13/251324
DATED              : April 16, 2013
INVENTOR(S)        : Kulkarni et al.

Page 1 of 1

It is certified that error appears in the above-identified patent and that said Letters Patent is hereby corrected as shown below:

On the Title Page:
Item (76), under "Inventors", in Column 1, Lines 2-3,
delete "Richard Michael Ashley Mass," and
insert -- Richard Michael Ashley Mann, --, therefor.

Signed and Sealed this
Ninth Day of July, 2013

Teresa Stanek Rea
*Acting Director of the United States Patent and Trademark Office*